United States Patent
Long et al.

(10) Patent No.: US 11,214,729 B2
(45) Date of Patent: Jan. 4, 2022

(54) RE-CROSSLINKING PARTICLE GEL FOR $CO_2$ CONFORMANCE CONTROL AND $CO_2$ LEAKAGE BLOCKING

(71) Applicant: The Curators of the University of Missouri, Columbia, MO (US)

(72) Inventors: Yifu Long, Rolla, MO (US); Baojun Bai, Rolla, MO (US); Thomas P. Schuman, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 188 days.

(21) Appl. No.: 16/552,540

(22) Filed: Aug. 27, 2019

(65) Prior Publication Data

US 2020/0071601 A1    Mar. 5, 2020

Related U.S. Application Data

(60) Provisional application No. 62/725,610, filed on Aug. 31, 2018.

(51) Int. Cl.
*C09K 8/588* (2006.01)
*E21B 43/16* (2006.01)
(Continued)

(52) U.S. Cl.
CPC ............. *C09K 8/588* (2013.01); *C09K 8/594* (2013.01); *E21B 33/138* (2013.01); *E21B 43/164* (2013.01)

(58) Field of Classification Search
CPC ....... C09K 8/588; C09K 8/594; E21B 33/138; E21B 43/164
See application file for complete search history.

(56) References Cited

U.S. PATENT DOCUMENTS

| 4,569,393 A | 2/1986 | Bruning et al. |
| 4,657,944 A | 4/1987 | Bruning et al. |

(Continued)

FOREIGN PATENT DOCUMENTS

| CN | 105504158 | 4/2016 |
| WO | 98/06929 | 2/1998 |

(Continued)

OTHER PUBLICATIONS

Lee et al. (2007). "CO2-in-Water Emulsion-Templated Poly(vinyl alcohol) Hydrogels Using Poly(vinyl acetate)-Based Surfactants," Macromolecules, 40(6), 1955-1961.

(Continued)

*Primary Examiner* — Crystal J Miller
(74) *Attorney, Agent, or Firm* — Hovey Williams LLP

(57) ABSTRACT

The present invention generally relates to the composition of particle gels for $CO_2$-EOR and $CO_2$ storage. More particularly, $CO_2$ resistant particle gels are provided that can re-crosslink at subterranean conditions. These particle gels can be deployed to improve the conformance of $CO_2$ flooding, $CO_2$ huff-puff, or Water-Alternative-Gas (WAG). The applications may also involve $CO_2$ storage, such as the blocking of $CO_2$ leakage and similar $CO_2$ processing.

20 Claims, 1 Drawing Sheet

(51) Int. Cl.
*E21B 33/138* (2006.01)
*C09K 8/594* (2006.01)

(56) References Cited

U.S. PATENT DOCUMENTS

| | | | |
|---|---|---|---|
| 4,793,416 | A | 12/1988 | Mitchell |
| 4,903,767 | A | 2/1990 | Shu et al. |
| 4,921,635 | A | 5/1990 | Enick |
| 4,941,533 | A | 7/1990 | Buller et al. |
| 5,399,269 | A | 3/1995 | Moradi-Araghi |
| 5,423,380 | A | 6/1995 | Johnston et al. |
| 5,465,792 | A | 11/1995 | Dawson et al. |
| 5,480,933 | A | 1/1996 | Fox et al. |
| 5,735,349 | A | 4/1998 | Dawson et al. |
| 6,165,947 | A | 12/2000 | Chang et al. |
| 6,454,003 | B1 | 9/2002 | Chang et al. |
| 7,300,973 | B2 | 11/2007 | Chang et al. |
| 7,644,764 | B2 | 1/2010 | Berkland et al. |
| 8,183,184 | B2 | 5/2012 | Berkland et al. |
| 8,389,446 | B2 | 3/2013 | Moradi-Araghi et al. |
| 8,822,388 | B2 | 9/2014 | Burns et al. |
| 9,139,762 | B2 | 9/2015 | Moradi-Araghi et al. |
| 9,267,075 | B2 | 2/2016 | Moradi-Araghi et al. |
| 9,701,887 | B2 | 7/2017 | Burns et al. |
| 9,777,122 | B2 | 10/2017 | O'Brien et al. |
| 10,000,683 | B2 | 6/2018 | Galindo et al. |
| 10,323,174 | B2 | 6/2019 | Guan et al. |
| 10,407,612 | B2 | 9/2019 | Guan et al. |
| 10,457,857 | B2 | 10/2019 | Perry et al. |
| 2007/0204989 | A1 | 9/2007 | Tang |
| 2011/0094746 | A1* | 4/2011 | Allison ............... C09K 8/424 166/308.5 |
| 2012/0037364 | A1 | 2/2012 | Guan et al. |
| 2012/0285691 | A1 | 11/2012 | Berger et al. |
| 2014/0102707 | A1 | 4/2014 | Moradi-Araghi et al. |
| 2014/0131043 | A1 | 5/2014 | Moradi-Araghi et al. |
| 2014/0144628 | A1 | 5/2014 | Moradi-Araghi et al. |
| 2016/0032170 | A1* | 2/2016 | Li ....................... C09K 8/588 166/305.1 |
| 2016/0137906 | A1 | 5/2016 | Guan et al. |
| 2018/0002592 | A1 | 1/2018 | Guan et al. |
| 2018/0230372 | A1* | 8/2018 | Liang ................. E21B 43/255 |
| 2019/0119559 | A1* | 4/2019 | O'Toole ............... E21B 43/20 |

FOREIGN PATENT DOCUMENTS

| | | |
|---|---|---|
| WO | 2010/144588 | 12/2010 |
| WO | 2013/006275 | 1/2013 |
| WO | 2013/112664 | 8/2013 |

OTHER PUBLICATIONS

Yamamoto et al. (2003). "Synthesis and Thermosensitive Properties of Poly[(N-vinylamide)-co-(vinyl acetate)]s and Their Hydrogels," Macromolecular Chemistry and Physics, 204(7), 1027-1033.
Ranjha et al. "Swelling and Aspirin Release Study: Cross-Linked pH-Sensitive Vinyl Acetate-co-Acrylic Acid (VAC-co-AA) Hydrogels," Drug Development and Industrial Pharmacy 34.5 (2008): 512-521.
Coste et al., "In-Depth Fluid Diversion by Pre-Gelled Particles. Laboratory Study and Pilot Testing," 2000 SPE/DOE Improved Oil Recovery Symposium held in Tulsa, Oklahoma, Apr. 3-5, 2000, 8 pages.
Sydansk et al., "Gel conformance treatments increase oil production in Wyoming," Oil and Gas Journal, Jan. 20, 1992, vol. 90:3, 3 pages. (abstract only attached).
Chauveteau et al., "Controlling Gelation Time and Microgel Size for Water Shutoff," SPE 59317, Society of Petroleum Engineers Inc., Prepared for Presentation at the 2000 SPE/DOE Improved Oil Recovery Symposium held in Tulsa, Oklahoma, Apr. 3-5, 2000, 8 pages.
Rousseau et al., "Rheology and Transport in Porous Media of New Water Shutoff/Conformance Control Microgels," SPE 93254, Society of Petroleum Engineers Inc., Prepared for Presentation at the 2005 SPE International Symposium on Oilfield Chemistry held in Houston, Texas, Feb. 2-4, 2005, 12 pages.
Zaitoun et al., "Using Microgels to Shut Off Water in a Gas Storage Well," SPE 106042, Society of Petroleum Engineers, Prepared for Presentation at the 2007 SPE International Symposium on Oilfield Chemistry held in Houston, Texas, Feb. 28-Mar. 2, 2007, 8 pages.
Al-Anazi et al., "Use of a pH Sensitive Polymer for Conformance Control," SPE 73782, Society of Petroleum Engineers Inc., Prepared for Presentation at the SPE International Symposium and Exhibition on Formation Damage Control held in Lafayette, Louisiana, Feb. 20-21, 2002, 8 pages.
Benson et al., "Development and Use of a Simulation Model for Mobility/Conformance Control Using a pH-Sensitive Polymer," SPE 109665, Society of Petroleum Engineers, Prepared for Presentation at the 2007 SPE Annual Technical Conference and Exhibition held in Anaheim, California, Nov. 11-14, 2007, 10 pages.
Pritchett et al., "Field Application of a New In-Depth Waterflood Conformance Improvement Tool," SPE 84897, Society of Petroleum Engineers Inc., Prepared for Presentation at the SPE International Improved Oil Recovery Conference in Asia Pacific held in Lumpur, Malaysia, Oct. 20-21, 2003, 8 pages.
Frampton et al., "Development of a novel waterflood conformance control system," SPE 89391, Society of Petroleum Engineers Inc., Prepared for Presentation at the 2004 SPE/DOE Fourteenth Symposium on Improved Oil Recovery held in Tulsa, Oklahoma, Apr. 17-21, 2004, 9 pages.
Bai et al., "Field and Lab Experience with a Successful Preformed Particle Gel Conformance Control Technology," SPE 164511, Society of Petroleum Engineers, Prepared for Presentation at the SPE Production and Operations Symposium held in Oklahoma City, Oklahoma, Mar. 23-26, 2013, 17 pages.
Zhang et al., "Preformed-Particle-Gel Transport Through Open Fractures and its Effect on Water Flow," SPE 129908, Society of Petroleum Engineers, SPE Journal, Jun. 2011, pp. 388-400.
Imqam et al., "Preformed Particle Gel Extrusion through Open Conduits during Conformance Control Treatments," SPE-169107-MS, Society of Petroleum Engineers, Prepared for Presentation at the SPE Improved Oil Recovery Symposium held in Tulsa, Oklahoma, Apr. 12-16, 2014, 15 pages.
Almohsin et al., SPE-169078-MS, "Transport of Nanogel through Porous Media and its Resistance to Water Flow," Society of Petroleum Engineers, Prepared for Presentation at the SPE Improved Oil Recovery Symposium held in Tulsa, Oklahoma, Apr. 12-16, 2014, 14 pages.
International Search Report and Written Opinion dated Dec. 16, 2019 in corresponding PCT/US2019/048349 filed Aug. 27, 2019, 10 pages.
Wang et al., "Mechanically robust re-crosslinkable polymeric hydrogels for water management of void space conduits containing reservoirs," Chemical Engineering Journal, 2017, vol. 317, pp. 952-960.
Machine translation of CN105504158, 14 pages.

* cited by examiner

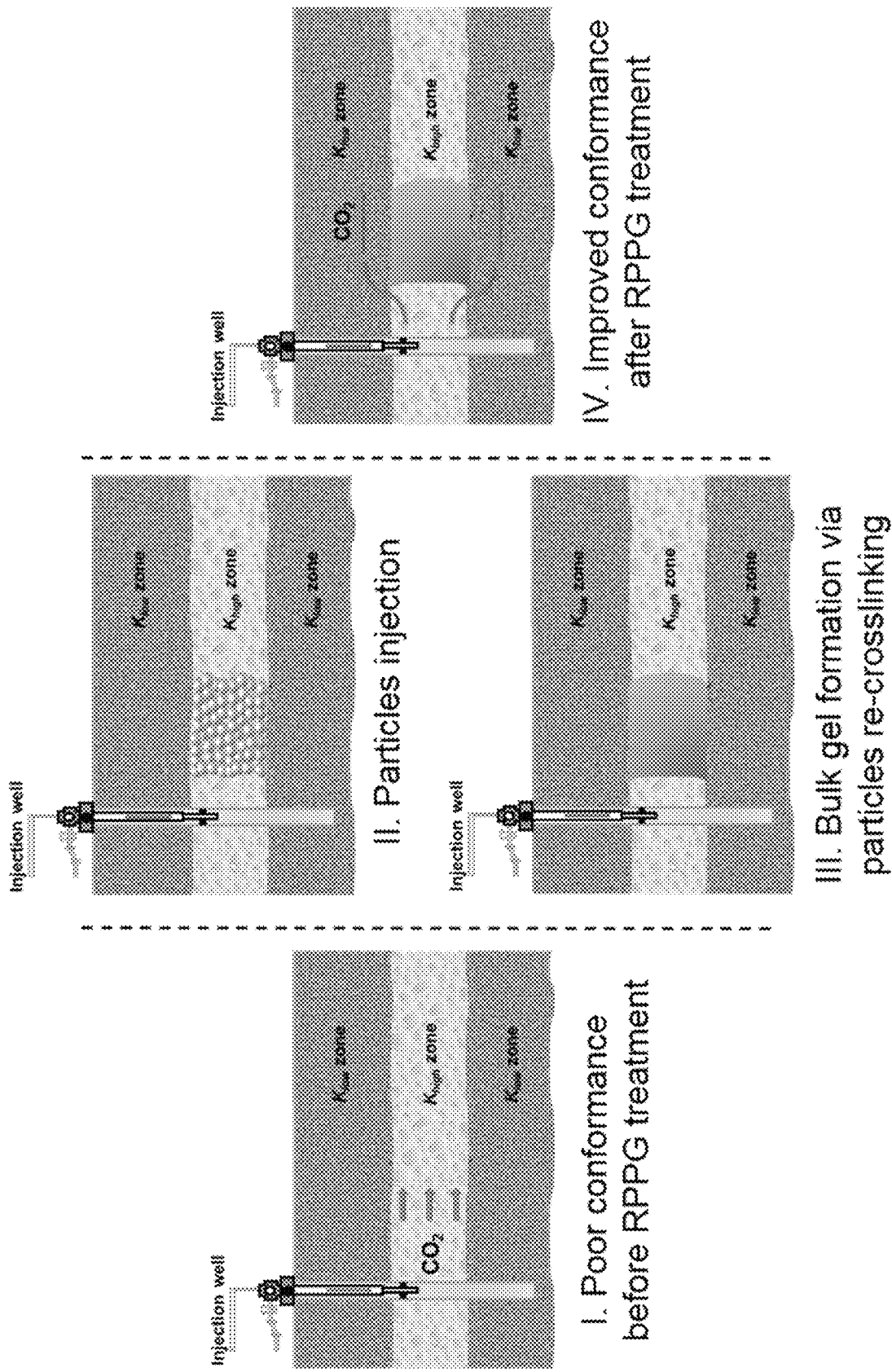

RE-CROSSLINKING PARTICLE GEL FOR $CO_2$ CONFORMANCE CONTROL AND $CO_2$ LEAKAGE BLOCKING

RELATED APPLICATION

This application claims the priority benefit under 35 U.S.C. § 119(e) of U.S. Provisional Patent Application Ser. No. 62/725,610 entitled "Re-crosslinking Particle Gel for $CO_2$ Conformance Control and $CO_2$ Leakage Blocking," filed Aug. 31, 2018, the entire disclosure of which is incorporated herein by reference

FIELD OF INVENTION

The present invention relates to the composition of particle gels for $CO_2$-EOR and $CO_2$ storage. More particularly, the present invention generally relates to $CO_2$-resistant particle gels that can re-crosslink at subterranean conditions. These particle gels can be deployed to improve the conformance of $CO_2$ flooding, $CO_2$ huff-puff, or Water-Alternative-Gas (WAG). The applications also involve $CO_2$ storage, such as the blocking of $CO_2$ leakage and similar $CO_2$ processing.

BACKGROUND

Carbon Dioxide-Enhanced Oil Recovery ($CO_2$-EOR), as a significant Carbon Capture and Storage (CCS) technology, contributes to reducing billions of tons of Greenhouse Gas (GHG) emissions in the U.S. market. Substantial $CO_2$-EOR projects have been established or are being launched across the U.S. market. For example, it has been reported in the Permian Basin of West Texas that approximately three kg of $CO_2$ could be sequestrated and produce one kg of oil.

In spite of the notable industrial success, the incremental oil recovery of $CO_2$-EOR is still impeded. This deficiency of $CO_2$ flooding is even more severe when $CO_2$ bypassing encompasses the heterogeneity of the oil reservoir. Therefore, aimed at remedying the bypassing and heterogeneity problem, gel treatments are extensively studied and implemented for improvement of $CO_2$ conformance.

Generally, the conventional gel systems include pristine preformed particle gels ("PPGs"), which have been found inadequate for remedying the reservoir fractures or conduits in virtue of "extrusion." Moreover, the supercritical $CO_2$ with intensive diffusibility is prone to breaking through the spacing within a gel pack and thereby deteriorates the plugging performance. Thus, additional improvements are still being sought in gel formulations.

SUMMARY

One or more embodiments of the present invention generally concern a swellable composition for controlling fluid flow. Generally, the swellable composition comprises a polymer matrix, a first crosslinker, and a second crosslinker. Furthermore, the polymer matrix comprises a first monomer having a re-crosslinking moiety, a second monomer having an acid resistance moiety, and a third monomer having a $CO_2$-phillic moiety.

One or more embodiments of the present invention generally concern a method of forming a swellable composition. Generally, the method comprises: (a) polymerizing a first monomer having a re-crosslinking moiety, a second monomer having an acid resistance moiety, and a third monomer having a $CO_2$-phillic moiety in the presence of a first crosslinker and a second crosslinker to form a polymer matrix; (b) drying the polymer matrix to form a dried polymer matrix; and (c) grinding the dried polymer matrix to form the swellable composition.

One or more embodiments of the present invention generally concern a method of altering or controlling a fluid present in a subterranean environment. Generally, the method comprises: (a) introducing a swellable composition into the subterranean environment so that the swellable composition contacts the fluid, wherein the swellable composition comprises a polymer matrix comprising a plurality of crosslinkable polymer chains, a first crosslinker, and a second crosslinker and wherein at least a portion of the second crosslinker is interspersed among the crosslinkable polymer chains of the polymer matrix; (b) allowing the second crosslinker to associate with the crosslinkable polymer chains upon exposure to the fluid to thereby form a swollen composition; and (c) at least partially controlling the flow of the fluid within the subterranean environment with the swollen composition. Additionally, the polymer matrix comprises a first monomer having a re-crosslinking moiety, a second monomer having an acid resistance moiety, and a third monomer having a $CO_2$-phillic moiety.

BRIEF DESCRIPTION OF THE FIGURES

Embodiments of the present invention are described herein with reference to the following drawing FIGURES, wherein:

FIG. 1 depicts an exemplary $CO_2$-plugging method with the inventive $CO_2$-RPPG.

WRITTEN DESCRIPTION

The present invention generally relates to the composition of particle gels for $CO_2$-EOR and $CO_2$ storage. More particularly, the present invention generally relates to $CO_2$-resistant particle gels that can re-crosslink at subterranean conditions. These particle gels can be deployed to improve the conformance of $CO_2$ flooding, $CO_2$ huff-puff, or Water-Alternative-Gas (WAG). The applications of the inventive particle gels may also involve $CO_2$ storage, such as the blocking of $CO_2$ leakage and similar $CO_2$ processing.

In various embodiments, a new class of particle gels is provided that can re-crosslink at subterranean conditions and maintain stability in supercritical $CO_2$. The inventive particle gels disclosed herein may be referred to as $CO_2$-resistant re-crosslinked preformed particle gels ("$CO_2$-RPPG"). Generally, in one or more embodiments, the $CO_2$-RPPG comprises: (a) a polymer matrix, (b) a Crosslinker I, (c) a Crosslinker II, and (d) additives, wherein all of the aforementioned components are homogeneously distributed in the $CO_2$-RPPG when synthesized. In certain embodiments, the polymer matrix comprises three monomer moieties that may include: (i) a first monomer with a re-crosslinking moiety, (ii) a second monomer with an acid-resistance moiety, and (iii) a third monomer with a $CO_2$-philic moiety. These moieties may enhance and facilitate the crosslinking with crosslinker II, thereby preventing the particle gel from dehydrating and tuning the affinity of hydrophilicity and $CO_2$-phicility.

Furthermore, in various embodiments, the $CO_2$-RPPG may be used in a $CO_2$-plugging method as shown in FIG. 1. As shown in Step I of FIG. 1, injection wells and boreholes may be subjected to certain subterranean conditions that can exhibit high $CO_2$ flow. Thus, as shown in Step II of FIG. 1, the $CO_2$-RPPG particles can be pumped into injection wells or boreholes at oilfields using brine or produced water as the carrier fluid. While subjected to these subterranean conditions, the $CO_2$-RPPG particles preformed by the polymer matrix and crosslinker I can be transported, along with the unreacted crosslinker II that is absorbed on the polymer matrix, into a target zone. After being placed into the target zone, the $CO_2$-RPPG particles may accumulate in the fractures or conduits, wherein the crosslinker II will gradually desorb from the precursor. Under the stimulus of the reservoir temperature, the active crosslinker II will cause all the particles of the $CO_2$-RPPG to stick together, and thereby generate an elastic bulk gel via crosslinking reactions (as shown in Step III of FIG. 1). This process, particularly the processing time, will be dependent on the reservoir temperature and the salinity of the carrier fluid, which can be artificially controlled by introducing reagents or additives. After re-crosslinking, a stable gel with good mechanical integrity will block the target zone or bypassing zone, and thereby divert the chased fluid (e.g., $CO_2$ or water) to the unswept zone as shown in Step IV of FIG. 1. Consequently, the re-crosslinked gel may act as a robust $CO_2$-plugging agent and will not undergo dehydration or other chemical degradations induced by $CO_2$. Thus, the inventive $CO_2$-RPPGs may overcome the flaws of previous polymer gels, particularly the deficiencies associated with extrusion, dehydration, and mechanical vulnerability, and offer a superior alternative for $CO_2$ conformance control and $CO_2$ leakage blocking.

As noted above, the $CO_2$-RPPG generally comprises a polymer matrix, a Crosslinker I, a Crosslinker II, and additives, wherein all the components are homogeneously distributed in the $CO_2$-RPPG when synthesized. The synthesis of $CO_2$-RPPG is conducted using multiple chemical constituents. Generally, in various embodiments, the $CO_2$-RPPG may comprise at least 50, 60, 70, 80, 90, 95, or 99 weight percent of the polymer matrix. Furthermore, in various embodiments, the $CO_2$-RPPG may comprise at least 0.01, 0.02, 0.04, 0.06, 0.08, 0.1, 0.12, 0.14, or 0.16 and/or less than 20, 15, 10, 5, 4, 3, 2, or 1 weight percent of Crosslinker I, Crosslinker II, and/or the additives. Moreover, in various embodiments, the $CO_2$-RPPG may comprise a molar ratio of Crosslinker I to Crosslinker II in the range of 1:50 to 50:1, 40:1 to 1:40, 30:1 to 1:30, 20:1 to 1:20, or 10:1 to 1:10.

Generally, in various embodiments, the method for forming the $CO_2$-RPPG may comprise: (a) polymerizing the first monomer having a re-crosslinking moiety, the second monomer having an acid resistance moiety, the third monomer having a $CO_2$-phillic moiety in the presence of Crosslinker I and Crosslinker II to form the polymer matrix; (b) drying the polymer matrix to form a dried polymer matrix; and (c) grinding the dried polymer matrix to form a swellable composition, i.e., the $CO_2$-RPPG. In one or more embodiments, the polymerizing of step (a) occurs at a temperature of at least 20, 25, 30, 35, 40, 45, or 50° C. and/or less than 200, 150, 100, 75, or 60° C. Furthermore, in various embodiments, the polymerizing may comprise ultrasonication that occurs for at least 10, 20, or 30 minutes and/or less than 6, 5, 4, or 3 hours. Additionally, in various embodiments, the polymerizing may occur for at least 1, 2, 3, or 4 hours and/or less than 18, 15, 12, or 10 hours.

As discussed above, the polymer matrix of the $CO_2$-RPPG comprises three moieties: (i) a first monomer with a re-crosslinking moiety, (ii) a second monomer with an acid-resistance moiety and (iii) a third monomer with a $CO_2$-philic moiety.

Typically, the first monomer with the "re-crosslinking moiety" refers to the predominant portion or units in the polymer chain of the polymer matrix. Generally, this moiety is formulated and established by water-soluble monomers, which can be initiated by a free radical, while the monomers need to be crosslinkable by Crosslinker II at subterranean conditions, therein forming covalent, ionic, or coordination bonding.

In certain embodiments, the monomer comprising a re-crosslinking moiety is a monomer possessing an anionic charge at neutral pH (7.0). Representative anionic monomers may include sodium, potassium, and ammonium salts of acrylic acid, methacrylic acid, maleic acid, itaconic acid, 2-propenoic acid, 2-methyl-2-propenoic acid, other water-soluble carboxylic acids, or combinations thereof. In certain embodiments, the monomer comprising a re-crosslinking moiety comprises a water-soluble carboxylic acid.

In certain embodiments, the monomer comprising a re-crosslinking moiety can be nonionic, and possess no charge at a pH ranging from about 4 to about 10. Representative nonionic monomers can include, for example, N-isopropylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate, dimethylaminoethyl methacrylate, maleic anhydride, N-vinyl pyrrolidone, vinyl acetate, N-vinyl formamide, or combinations thereof.

In certain embodiments, the monomers comprising a re-crosslinking moiety can be a combination of anionic and nonionic monomers. In one or more embodiments, the preferred monomer for a re-association of free gel particles moiety is an acrylamide or a derivative thereof.

In certain embodiments, the monomers comprising a re-crosslinking moiety can comprise sodium salts of acrylic acid, potassium salts of acrylic acid, ammonium salts of acrylic acid, methacrylic acid, maleic acid, itaconic acid, 2-propenoic acid, 2-methyl-2-propenoic acid, or combinations thereof.

In one or more embodiments, the polymer matrix may comprise at least 40, 45, 50, 55, 60, 65, 70, 75, or 80 and/or less than 99, 95, 90, or 85 molar percent of at least one monomer comprising a re-crosslinking moiety based on the total molar content of the first monomer with a re-crosslinking moiety, the second monomer with an acid-resistance moiety, and the third monomer with a $CO_2$-philic moiety.

Typically, the "acid-resistance moiety" denotes another portion or segments in the polymer matrix that exhibit insensitivities to a pH environment, particularly aqueous acidic conditions. This contrasts with conventional pristine particle gels and aqueous polymer gels, which commonly comprise sidegroups of carboxylate (—$COO^-$) in their polymer chains and are sensitive to pH. For which the dissociation of carboxylic groups having a pKa value of 4.2 may account, the carboxylate (—$COO^-$) sidegroups tend to associate with the protons that are produced by $CO_2$ dissolving. These counterions, however, cause a reduction of electrostatic charging, thereby diminishing the repulsion between polymer chains. As a result, the conventional pristine particle gels and aqueous polymer gels will shrink and lose their original volume until an equilibrium of deswelling. However, due to the inventive formulation described herein, this phenomenon can be alleviated through the incorporation of an acid-resistant moiety into the $CO_2$-RPPG that is insensitive to the acidic environment, thereby preventing the collapse of chain spacing.

In certain embodiments, a monomer comprising an acid-resistance moiety is composed of a sulfonate (i.e., 2-acrylamido-2-methyl-1-propanesulfonic acid sodium salt (AMPS)), sulfate, or phosphate monomers which contain bulky group, and thereby facilitate chain spacing with steric hindrance. Moreover, these monomers may possess a low value of pKa, such as the sulfonate group that has a pKa value of 2.3. The representative monomers comprising an acid-resistant moiety may include a sulfonate, sulfate, or phosphate group; sodium or potassium vinylsulfonate and vinyl sulfate salts like sodium or potassium vinyl sulfates; phenyl vinyl sulfonate salts like sodium or potassium phenyl vinyl sulfate; and/or vinyl phosphate salts like sodium or potassium vinyl sulfate.

In certain embodiments, the monomer comprising an acid-resistance moiety comprises a monomer exhibiting a pka of less than 4, 3.5, 3, 2.9, 2.8, 2.7, 2.6, 2.5, or 2.4.

In certain embodiments, the monomer comprising an acid-resistance moiety may comprise water-soluble monomers that contain cationic pendant groups, such as diallyldimethylammonium chloride, (3-(methacryloylamino) propyl) trimethyl ammonium chloride, (2-(methacryloyloxy) ethyl) trimethyl ammonium chloride, vinylbenzyl trimethyl ammonium chloride, or combinations thereof. Additionally or alternatively, in various embodiments, the monomers with cationic pendant groups may include dimethylaminoethylacrylate methyl chloride quaternary salt, dimethylaminoethylacrylate benzyl chloride quaternary salt, dimethylaminoethylmethacrylate methyl chloride quaternary salt, or combinations thereof. In one or more embodiments, the monomer with an acid-resistance moiety may comprise 2-Acrylamido-2-methyl-1-propanesulfonic acid sodium salt (Na-AMPS).

In one or more embodiments, the polymer matrix may comprise at least 0.5, 1, 2, 3, or 4 and/or less than 50, 45, 40, 35, 30, 25, 20, 15, or 10 molar percent of at least one monomer comprising an acid-resistance moiety based on the total molar content of the first monomer with a re-crosslinking moiety, the second monomer with an acid-resistance moiety, and the third monomer with a $CO_2$-philic moiety.

As used herein, "$CO_2$-philic moiety" is defined as a portion or segments in the polymer matrix that comprises "$CO_2$ philes." As used herein, the term "$CO_2$ phile" refers to a molecular entity that is attracted to $CO_2$ molecules and has strong interactions with $CO_2$ that are more thermodynamically favorable than the interactions with polar solvents.

The underlying mechanism in regard to gel performance in supercritical $CO_2$ conditions may be strongly linked with the interactions between water, $CO_2$, and the polymeric surface. For a highly hydrophilic surface in $CO_2$, the water binding sites may overlap $CO_2$ binding; thus, the $CO_2$ adsorption capacity will be significantly reduced due to the severe competitive sorption. The binded water can be tightly adsorbed onto the pore wall of a gel, whereas $CO_2$ tends to adsorb away from the wall toward the pore center, rather than forming a monolayer near the pore wall. As a result, $CO_2$ molecules, favored by solubility and diffusivity, will transport through the immobilized water in hydrogel, therein forming passageways for permeation. To combat this phenomenon, the polymer matrices of the present invention comprise $CO_2$ philes, which can modify the surface property of the polymer matrix and thereby improve the affinity to $CO_2$. Consequently, the $CO_2$ molecule will adsorb onto the moiety or segment of the $CO_2$ philes and be maintained, rather than transported via passageways. The free volume within the polymer matrix on that account may be reduced, and the flow hindrance for chased $CO_2$ will be enhanced.

In certain embodiments, the $CO_2$-philic monomers may comprise vinyl benzoate, benzyl vinyl formate, ethyl vinyl ether, methyl vinyl ether, vinylidene fluoride, lactic acid or lactic acid cyclic dimmer, glycolic acid or glycolide, hexamethylcyclotrisiloxane, 1H,1H,2H,2H-perfluorooctyl methacrylate, or combinations thereof. In one or more embodiments, the preferred $CO_2$-philic monomer is vinyl acetate. Studies have shown that poly(vinyl acetate) (PVAc) has reasonable solubility in $CO_2$ because of its amorphous structure, low melting point, and weak Lewis acid base interactions between the acetate group and $CO_2$.

In certain embodiments, the monomer comprising the $CO_2$-philic segment is synthesized by free-radical polymerization in aqueous solutions. In such embodiments, the $CO_2$-philic monomers (e.g., vinyl acetate) may be water-soluble and may co-polymerize with the re-crosslinkable monomers and acid-resistant monomers.

In various embodiments, the synthesis method of the $CO_2$-philic monomers is not limited and other polymerization routines such as ionic, ring-opening, or condensation polymerization can also be deployed. In some embodiments, the polymerization of the $CO_2$-philic monomers takes place within a different non-polar solvent, therein forming the configuration of a semi-inter penetrating network. In some embodiments, the $CO_2$-philes might be introduced by dispersion and may be incorporated in the form of a polymer, such as polyvinyl acetate.

In one or more embodiments, the polymer matrix may comprise at least 1, 2, 3, 4, 5, or 10 and/or less than 50, 45, 40, 35, 30, 25, 20, or 15 molar percent of at least one $CO_2$-philic monomer based on the total molar content of the first monomer with a re-crosslinking moiety, the second monomer with an acid-resistance moiety, and the third monomer with a $CO_2$-philic moiety.

As used herein, "Crosslinker I" is defined to include any reagents that can connect the polymer chains via crosslinkings, which take place simultaneously with the formation of polymer chains. In various embodiments, Crosslinker I is a divinyl monomer that can copolymerize with vinyl monomers and form crosslinking points during the propagation of polymers. At this point, the crosslinking denotes a chemical crosslinking, namely permanent, covalent bonding. Representative crosslinkers that may be used as Crosslinker 1 may include, for example, methylene bisacrylamide, diallylamine, triallylamine, divinyl sulfone, diethyleneglycol diallyl ether, or combinations thereof. In one or more embodiments, the preferred crosslinker is methylene bisacrylamide (MBA).

In certain embodiments, Crosslinker I comprises diacrylyl tertiary amide, diacrylylpiperazine, diallyltartardiamide, dihydroxyethylene-bis-acrylamide, and bis-acrylylcystamine, trimethylolpropane trimethacrylate, propyleneglycol triacrylate, tripropyleneglycol diacrylate, allyl methacrylate, triethyleneglycol dimethacrylate, tetrahydrofurfuryl methacrylate, trimethylolpropane triacrylate, or combinations thereof. In one or more embodiments, Crosslinker I may comprise a multifunctional crosslinker such as pentaerythritol triacrylate, 1,5 pentane diol dimethacrylate, pentaerythritol triallylether, or combinations thereof.

Crosslinker II may comprise any reagents that can react with the "re-associating moiety," therein generating self-healing and discrete particle reassociations, to thus produce a bulk gel at subterranean conditions comprised of discrete polymer gel particles that associate to form a gel possessing bulk gel properties. More particularly, Crosslinker II is able to react with the sidegroups of the "re-crosslinking moiety" and thereby form coordination bonding, covalent bonding, ionic bonding, and/or physical tackifying. In other words, the polymer matrix may comprise a plurality of crosslinkable polymer chains and at least a portion of the Crosslinker II may be interspersed among the crosslinkable polymer chains. Consequently, the Crosslinker II may be capable of associating with the polymer chains upon exposure to a fluid capable of swelling the polymer matrix.

Crosslinker II can be either a single component or multiple components, which comprise multiple crosslinkers together as a combination.

In certain embodiments, Crosslinker II comprises a chelate comprising a multivalent metal ion (e.g., $Al^{3+}$, $Fe^{3+}$, $cr^{3+}$, $Ti^{4+}$, $Sn^{4+}$, or $Zr^{4+}$) and a ligand such as acetates, tartrates, malonates, propionates, benzoates, and/or citrates. The ligands may be organic ions complexed with a multivalent metal ion via coordination bonding, which can affect the kinetic rate of re-crosslinking. These crosslinkers can react with carboxyl groups or other reactive groups that are pendant on the "re-crosslinking moiety," and thereby a bulk gel will be obtained in-situ. Representative Crosslinker II compounds can include, for example, Cr(III)-acetate, Cr(III)-propionate, Zr(IV)-acetate, Zr(IV)-lactate, or combinations thereof. In one or more embodiments, the preferred Crosslinker II is Zr(IV)-acetate.

In certain embodiments, Crosslinker II is polymeric component such as polyethyleneimine, poly-L-lysine, poly-ε-lysine, polyallylamine, polyvinylamine, or combinations thereof. These crosslinkers can connect neighbored amide groups via transamidation.

In various embodiments, the additives may comprise hydrophilic silica (e.g., silicon oxide) nanoparticles ("SNPs") having an average size of at least 10, 15, 20, 30, 35, 40, 45, or 50 nm and/or less than 500, 400, 300, 200, 100, or 50 nm. The incorporation of SNPs, in one aspect, may contribute to an increase of interfacial area between the $CO_2$/water interface, therein forming a "3-phase contact line." The adsorbed $CO_2$ molecules, as a consequence, are prone to be stabilized. Moreover, the SNPs may split the large water clusters, which are attached to the polymer matrix, into smaller water-SNP hybrid clusters, therein leading to an enhancement of $CO_2$ adsorption. Consequently, this may favor the resistance to $CO_2$. In one or more embodiments, the $CO_2$-RPPG may comprise at least 0.01, 0.02, 0.04, 0.06, 0.08, or 0.1 and/or less than 20, 15, 10, 5, 4, 3, 2, or 1 weight percent of one or more SNPs.

The SNPs, in another aspect, may reinforce the re-crosslinked hydrogel in regard to viscoelasticity and mechanical integrity. Generally, $CO_2$ molecules are known plasticizers, which affect the chain mobility of the polymer and, thus, may decrease the glass transition temperature (Tg) of the polymers. However, the SNPs may function as anti-plasticizers and depress the shortscale cooperative motions, eventually favoring Tg. In virtue of the SNPs incorporation, more polymer chains may be confined within the vicinity of the SNPs, thereby inducing a reduction of the polymer chain's mobility. Hence, the additives may improve the hydrogel's modulus beyond that of a conventional pristine gel. Moreover, the resulting reinforcement of the gel pore-wall can alleviate the gel shrinkage that is induced by the capillary pressure occurred during water-$CO_2$ exchange.

In various embodiments, the additives may comprise fibers, such as polyethylene fibers, PVA fibers, nylon fibers, or polypropylene fibers. The fibers may enhance the toughness of the resulting particle gels. In one or more embodiments, the fibers may have an average length of at least 1, 2, 3, 4, or 5 mm and/or less than 30, 25, 20, or 15 mm. Additionally or alternatively, in various embodiments, the fibers may comprise an average diameter of at least 1, 2, 5, or 8 microns and/or less than 100, 75, 50, or 40 microns.

Furthermore, in various embodiments, the $CO_2$-RPPG may comprise at least 0.01, 0.02, 0.03, 0.04, 0.05, 0.06, 0.08, or 0.1 and/or less than 20, 15, 10, 5, 4, 3, 2, or 1 weight percent of one or more fibers.

In various embodiments, the additives comprise both SNPs and an oxygen scavenger. Oxygen scavengers are reducing agents which can remove the dissolved oxygen from an aqueous solution through a gradual process of a redox reaction. In certain embodiments, the oxygen scavenger comprises dithionite salts (i.e., sodium dithionite), thiosulfate salts (i.e., sodium thiosulfate), sulfite salts (i.e., sodium sulfite), bisulfite salts (i.e., sodium bisulfite), metabisulfite salts, persulfate salts (e.g., ammonium persulfate), or combinations thereof. In one or more embodiments, the oxygen scavengers are bisulfite salts, such as ammonium bisulfite and sodium bisulfite. In other embodiments, the oxygen scavengers can comprise sodium thiosulfate, ammonium persulfate, sodium bisulfite, sodium metabisulfite, or combinations thereof.

Due to its unique formulation, the $CO_2$-RPPG may exhibit desirable shear modulus characteristics. In various embodiments, the $CO_2$-RPPG may exhibit a shear modulus of at least 80, 85, 90, 95, 100, 105, 110, 15, 120, 125, 150, 200, 250, 300, 350, or 400 Pa after being aged for 1 minute, 5 minutes, 1 hour, 12 hours, 1 day, 10 day, 20 days, or 30 days at 45° C. or 65° C.

Furthermore, the $CO_2$-RPPG may also exhibit desirable swelling properties due to its unique formulation. In various embodiments, the $CO_2$-RPPG may exhibit a swelling ratio of at least 5, 10, 15, 20, 25, 30, or 35 percent and/or less than 75, 60, 55, 50, or 45 percent after a time period of 2, 4, 6, 8, 10, 12, 15, 20, 25, 30, 35, or 40 hours at 23° C. or 73° C. in an aqueous solution comprising 0.5, 1, or 5 weight percent of NaCl at a pH of 1, 3, 5, or 7. The "swelling ratio" refers to the fractional increase in the weight of the particulate gel due to fluid absorption. The swelling ratio may be measured by the following formula:

$$SR = \frac{V_{particle,a}}{V_{particle,b}} = \frac{V_{total,a} - V_{water,a}}{V_{total,b} - V_{water,b}}.$$

In accordance with the above formula, dry particles may be placed into a graduated cylinder and brine (e.g. 1 wt % NaCl) with a certain volume ($V_{water,b}$) may be added. The total volume of the brine and particles ($V_{total,b}$) may then be obtained. The total volume can be read again as $V_{total,a}$, once the particle volume does not increase and is considered fully swollen. The remaining brine may then be screened out and measured again for volume, $V_{water,a}$.

In various embodiments, the $CO_2$-RPPG exhibits a storage modulus of at least 50, 100, 150, 200, or 250 Pa as measured at a frequency of 1 Hz and a stress of 1 Pa at ambient temperature (23° C.).

In various embodiments, the $CO_2$-RPPG may comprise an average particle size of at least 0.1, 0.2, 0.3, 0.4, or 0.5 mm and/or less than 10, 5, 4, 3, 2, 1, or 0.9 mm.

In various embodiments, the $CO_2$-RPPG may comprise an average particle size of 0.1 to 100 μm or as small as 10 nm, which can be obtained through grinding, ball milling or colloidal milling.

The $CO_2$-RPPG described herein may be used to improve the conformance of $CO_2$ flooding, $CO_2$ huff-puff, or Water-Alternative-Gas (WAG). The applications also involve $CO_2$ storage, such as the blocking of $CO_2$ leakage and similar $CO_2$ processing. In various embodiments, the $CO_2$-RPPG may be used in a method of altering or controlling a fluid present in a subterranean environment, such as wells, pipelines, pipelines, or fractures. Generally, the method may involve introducing the $CO_2$-RPPG into a subterranean environment via a carrier fluid, such as brine or water, and allowing the $CO_2$-RPPG to contact a particular fluid, such as $CO_2$. In one or more embodiments, the carrier fluid can be selected from the group consisting of water, brine solvent (comprising NaCl, $CaCl_2$, and/or $AlCl_3$), and other fluids that cause the composition to swell.

Upon contacting the fluid, the Crosslinker II is capable of associating with the polymer chains of the polymer matrix upon exposure to the fluid. Consequently, the $CO_2$-RPPG may begin to swell upon contacting the fluid. This swelling indicates the association, crosslinking, and/or reassembly of the polymer matrix. In other words, the swelling may cause the $CO_2$-RPPG to associate, combined together, and form a bulk gel. In certain embodiments, the swelling may commence within 0.1 seconds to 300 seconds upon contacting the fluid.

In various embodiments, the $CO_2$-RPPG is in the form particles having an initial average particle size prior to contacting the fluid and a second average particle size after contacting the fluid and swelling. In such embodiments, the second average particle size can be at least about 5, 10, 15, 20, 25, 30, 35, or 40 times greater than that of the initial average particle size.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

This invention can be further illustrated by the following examples of embodiments thereof, although it will be understood that these examples are included merely for the purposes of illustration and are not intended to limit the scope of the invention unless otherwise specifically indicated.

Example 1

A representative $CO_2$-resistant re-crosslinking preformed particle gel was prepared using free radical polymerization in solution. The following abbreviations apply to all the Examples of the present application.

| Abbreviation | Meaning |
| --- | --- |
| AMPS-Na | 2-Acrylamido-2-methyl-1-propanesulfonic acid sodium salt |
| AM | Acrylamide |
| VAc | Vinyl acetate |
| $Zr(Ac)_4$ | Zirconium acetate |
| MBAM | N,N'-Methylenebis(acrylamide) |
| APS | Ammonium persulfate |
| STS | Sodium thiosulfate |

In a typical preparation, AMPS-Na (4.27 g, 19.42 mmol) and AM (22.5 g, 316.9 mmol) were added to the deionized water (100 mL). Under vigorous stirring, $Zr(Ac)_4$ solution (5.86 mL) and VAc (5.38 mL, 58.14 mmol) were dropped, which was followed by an addition of MBAM (1.75 mg, 0.011 mmol). The silica nanoparticles (20 mg, 15-20 nm) were slowly added to the solution; the dispersion was then subjected to ultrasonication for 30 minutes. After bubbling with argon for 30 min, APS (80 mg, 0.35 mmol) was added; the dispersion was then subjected to heating in an oil-bath at 50° C. under vigorous stirring until the formation of the bulk gel. Polymerization was carried out for 6 hours, after which the bulk gel was dried and ground.

Example 2

A representative $CO_2$-resistant re-crosslinking preformed particle gel comprising SNPs was prepared using free radical polymerization in solution.

More particularly, AMPS-Na (4.27 g, 19.42 mmol), AM (22.5 g, 316.9 mmol), $Zr(Ac)_4$ solution (5.86 mL, 16 wt % dissolved in acetate acid), VAc (5.38 mL, 58.14 mmol), MBAM (1.75 mg, 0.011 mmol), silica nanoparticles (20 mg, 15-20 nm), APS (80 mg, 0.35 mmol), and distilled water (100 mL) were combined under vigorous stirring and subjected to the polymerization conditions described in Example 1. The resulting bulk gel was dried and ground.

Example 3

A representative $CO_2$-resistant re-crosslinking preformed particle gel comprising a redox system was prepared using free radical polymerization in solution.

More particularly, AMPS-Na (4.27 g, 19.42 mmol), AM (22.5 g, 316.9 mmol), $Zr(Ac)_4$ solution (5.86 mL, 16 wt % dissolved in acetate acid), VAc (5.38 mL, 58.14 mmol), MBAM (25 mg, 0.015 mmol), APS (80 mg, 0.35 mmol), STS (70 mg, 0.44 mmol), and 100 mL distilled water were combined under vigorous stirring and subjected to the polymerization conditions described in Example 1, except the polymerization occurred at 23° C. The resulting bulk gel was dried and ground.

Example 4

A representative $CO_2$-resistant re-crosslinking preformed particle gel comprising a fiber system was prepared using free radical polymerization in solution.

More particularly, AMPS-Na (4.27 g, 19.42 mmol), AM (22.5 g, 316.9 mmol), $Zr(Ac)_4$ solution (5.86 mL, 16 wt % dissolved in acetate acid), VAc (5.38 mL, 58.14 mmol), MBAM (17.5 mg, 0.011 mmol), polypropylene fiber—ProCon M® (0.05 g), APS (80 mg, 0.35 mmol), and 100 mL distilled water were combined under vigorous stirring and subjected to the polymerization conditions described in Example 1. The resulting bulk gel was dried and ground.

The invention claimed is:

1. A swellable composition for controlling fluid flow, said swellable composition comprising a polymer matrix, a first crosslinker, and a second crosslinker, wherein said polymer matrix comprises a first monomer having a re-crosslinking moiety, a second monomer having an acid resistance moiety, and a third monomer having a $CO_2$-phillic moiety.

2. The swellable composition of claim 1, wherein said swellable composition is in the form of a particulate gel.

3. The swellable composition of claim 1, wherein said first monomer comprises a water-soluble carboxylic acid and said second monomer comprises a water-soluble cationic monomer.

4. The swellable composition of claim 1, wherein said first monomer comprises N-isopropylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate, dimethylaminoethyl methacrylate, maleic anhydride, N-vinyl pyrrolidone, vinyl acetate, N-vinyl formamide, or combinations thereof,
wherein said second monomer comprises sodium vinylsulfonate, potassium vinylsulfonate, sodium phenyl vinyl sulfate, potassium phenyl vinyl sulfate, sodium vinyl sulfate, 2-acrylamido-2-methyl-1-propanesulfonic acid sodium salt, potassium vinyl sulfate, or combinations thereof, and
wherein said third monomer comprises vinyl benzoate, benzyl vinyl formate, vinyl acetate, ethyl vinyl ether, methyl vinyl ether, vinylidene fluoride, lactic acid, lactic acid cyclic dimer, glycolic acid, glycolide, hexamethylcyclotrisiloxane, 1H,1H,2H,2H-perfluorooctyl methacrylate, or combinations thereof.

5. The swellable composition of claim 1, wherein said first monomer comprises an acrylamide or a derivative thereof,
wherein said second monomer comprises 2-acrylamido-2-methyl-1-propanesulfonic acid sodium salt, and
wherein said third monomer comprises vinyl acetate.

6. The swellable composition of claim 1, wherein said first crosslinker comprises methylene bisacrylamide, diallylamine, triallylamine, divinyl sulfone, diethyleneglycol diallyl ether, or combinations thereof.

7. The swellable composition of claim 6, wherein said second crosslinker comprises Cr(III)-acetate, Cr(III)-propionate, Zr(IV)-acetate, Zr(IV)-lactate, or combinations thereof.

8. The swellable composition of claim 1, further comprising one or more additives, wherein said additives comprise silica particles, fibers, an oxygen scavenger, or combinations thereof.

9. The swellable composition of claim 1, wherein said polymer matrix comprises at least 40 mole percent of said first monomer based on the total mole content of said first monomer, said second monomer, and said third monomer;
wherein said polymer matrix comprises at least 0.5 mole percent and less than 50 mole percent of said second monomer based on the total mole content of said first monomer, said second monomer, and said third monomer;
wherein said polymer matrix comprises at least 1 mole percent and less than 50 mole percent of said third monomer based on the total mole content of said first monomer, said second monomer, and said third monomer.

10. The swellable composition of claim 9, wherein said swellable composition comprises at least 80 weight percent of said polymer matrix.

11. A method of forming said swellable composition of claim 1, said method comprising:
(a) polymerizing said first monomer, said second monomer, and said third monomer in the presence of said first crosslinker and said second crosslinker to form said polymer matrix;
(b) drying said polymer matrix to form a dried polymer matrix; and
(c) grinding said dried polymer matrix to form said swellable composition.

12. The method of claim 11, wherein said polymerizing of step (a) occurs at a temperature of 20 to 200° C.

13. The method of claim 11, wherein said polymerizing of step (a) comprises ultrasonication.

14. A method of altering or controlling a fluid present in a subterranean environment comprising:
(a) introducing a swellable composition according to claim 1 into said subterranean environment so that said swellable composition contacts said fluid,
wherein said polymer matrix comprises a plurality of crosslinkable polymer chains and
at least a portion of said second crosslinker is interspersed among said crosslinkable polymer chains;
(b) allowing said second crosslinker to associate with said crosslinkable polymer chains upon exposure to said fluid to thereby form a swollen composition; and
(c) at least partially controlling the flow of said fluid within said subterranean environment with said swollen composition.

15. The method of claim 14, wherein said fluid comprises water or a brine solvent.

16. The method of claim 14, wherein said subterranean environment comprises a well, pipeline, or fracture.

17. The method of claim 14, wherein said swellable composition is in the form particles having an initial average particle size prior to said introducing of step (a) and said swollen composition is in the form of particles having a second average particle size, and
wherein said second average particle size that is at least 5 times greater than that of said initial average particle size.

18. The method of claim 14, wherein said first monomer comprises N-isopropylacrylamide, N,N-diethylacrylamide, dimethylaminopropyl acrylamide, dimethylaminopropyl methacrylamide, acryloyl morpholine, hydroxyethyl acrylate, hydroxypropyl acrylate, hydroxyethyl methacrylate, hydroxypropyl methacrylate, dimethylaminoethylacrylate, dimethylaminoethyl methacrylate, maleic anhydride, N-vinyl pyrrolidone, vinyl acetate, N-vinyl formamide, or combinations thereof,
wherein said second monomer comprises sodium vinylsulfonate, potassium vinylsulfonate, sodium phenyl vinyl sulfate, potassium phenyl vinyl sulfate, sodium vinyl sulfate, 2-acrylamido-2-methyl-1-propanesulfonic acid sodium salt, potassium vinyl sulfate, or combinations thereof, and
wherein said third monomer comprises vinyl benzoate, benzyl vinyl formate, vinyl acetate, ethyl vinyl ether, methyl vinyl ether, vinylidene fluoride, lactic acid, lactic acid cyclic dimer, glycolic acid, glycolide, hexamethylcyclotrisiloxane, 1H,1H,2H,2H-perfluorooctyl methacrylate, or combinations thereof.

19. The method of claim 14, wherein said first monomer comprises an acrylamide or a derivative thereof,
wherein said second monomer comprises 2-acrylamido-2-methyl-1-propanesulfonic acid sodium salt, and
wherein said third monomer comprises vinyl acetate.

20. The method of claim 19, wherein said first crosslinker comprises methylene bisacrylamide, diallylamine, triallylamine, divinyl sulfone, diethyleneglycol diallyl ether, or combinations thereof, and
wherein said second crosslinker comprises Cr(III)-acetate, Cr(III)-propionate, Zr(IV)-acetate, Zr(IV)-lactate, or combinations thereof.

* * * * *